US 012228846B2

(12) United States Patent
McRee

(10) Patent No.: US 12,228,846 B2
(45) Date of Patent: Feb. 18, 2025

(54) CAMERA CONCEALING HUNTING STAND ASSEMBLY

(71) Applicant: Scott McRee, Jefferson, GA (US)

(72) Inventor: Scott McRee, Jefferson, GA (US)

( * ) Notice: Subject to any disclaimer, the term of this patent is extended or adjusted under 35 U.S.C. 154(b) by 149 days.

(21) Appl. No.: 18/104,894

(22) Filed: Feb. 2, 2023

(65) Prior Publication Data
US 2024/0264511 A1 Aug. 8, 2024

(51) Int. Cl.
G03B 17/56 (2021.01)
A01M 31/00 (2006.01)
F41H 3/00 (2006.01)

(52) U.S. Cl.
CPC ........... *G03B 17/561* (2013.01); *A01M 31/00* (2013.01); *F41H 3/00* (2013.01)

(58) Field of Classification Search
None
See application file for complete search history.

(56) References Cited

U.S. PATENT DOCUMENTS

| 2,992,503 | A | * | 7/1961 | Webb | A01M 31/025 |
| | | | | | 135/901 |
| 5,819,687 | A | * | 10/1998 | Lister | A01K 5/0114 |
| | | | | | D30/121 |
| 5,917,545 | A | | 6/1999 | Kowno | |
| 6,033,744 | A | * | 3/2000 | Bright, Sr. | A01G 9/00 |
| | | | | | 428/15 |
| D577,424 | S | * | 9/2008 | Clark | D23/266 |
| 7,534,056 | B2 | | 5/2009 | Cross | |
| D642,699 | S | * | 8/2011 | Hunter | D25/7 |
| 8,810,718 | B1 | * | 8/2014 | Cuddeback | H04N 23/56 |
| | | | | | 396/164 |
| 9,759,989 | B1 | * | 9/2017 | Edmunds | H04N 5/33 |

(Continued)

FOREIGN PATENT DOCUMENTS

| DE | 202014006561 U1 | * | 2/2015 | ............ G03B 17/02 |
| DE | 202016001974 U1 | * | 7/2016 | |
| GB | 2591432 | | 4/2021 | |

OTHER PUBLICATIONS

Decorative Tree Stump 4K Hidden Surveillance Camera . . . , www.amazon.com/Decorative-Hidden-Surveillance-Standby-Battery/dp/B07VZ8PJPS, first available for sale on Aug. 3, 2019. (Year: 2019).*

(Continued)

Primary Examiner — Rodney E Fuller
(74) Attorney, Agent, or Firm — Lamás

(57) ABSTRACT

A camera concealing hunting stand assembly for concealing a remote camera with camouflage includes a tube including a base wall and perimeter wall coupled to and extending upwardly from the base wall. An exterior surface of the tube has camouflage indicia camouflaging the tube within a hunting environment. A plurality of supports is coupled to the tube and supports the tube in an upright position relative to a ground surface. A compartment is coupled to the tube and removably stores a remote camera. An extractor is slidably positionable within the compartment and includes a plate being slidably positioned within the compartment. The plate is abuttable to the bottom wall and a top of the plate is abuttable to a bottom of the remote camera, wherein the extractor removes the remote camera from the compartment as the extractor slides upwardly in the compartment.

8 Claims, 6 Drawing Sheets

(56) References Cited

U.S. PATENT DOCUMENTS

| | | | |
|---|---|---|---|
| 10,178,282 B2 | 1/2019 | Unger | |
| 2005/0232624 A1 | 10/2005 | Baldwin | |
| 2008/0023055 A1* | 1/2008 | Krampitz | E04H 15/001 |
| | | | 135/117 |
| 2019/0212637 A1* | 7/2019 | D'Acquisto | A01M 31/002 |
| 2020/0186699 A1 | 6/2020 | Hlatky | |
| 2021/0324653 A1* | 10/2021 | Narvaez-Newman | |
| | | | A45B 23/00 |

OTHER PUBLICATIONS

Stump Blinds, Cam Stump, web.archive.org/web/20220627013321/stumpblinds.com/product/camstump/, Jun. 27, 2022. (Year: 2022).*

* cited by examiner

CAMERA CONCEALING HUNTING STAND ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to camera housing and more particularly pertains to a new camera housing for concealing a remote camera with camouflage.

(2) Description of Related Art Including Information Disclosed Under 37 CFR 1.97 and 1.98

The prior art relates to camera housings and includes a variety of camera housings removably containing a remote camera configured to view animals for hunting. Known prior art does not include a camera housing configured for being positioned within a hunting environment to conceal a remote camera with camouflage.

BRIEF SUMMARY OF THE INVENTION

An embodiment of the disclosure meets the needs presented above by generally comprising a tube including a base wall and perimeter wall being coupled to and extending upwardly from the base wall. A top edge of the perimeter wall defines an opening into an interior space of the tube. An exterior surface of the tube has camouflage indicia configured for camouflaging the tube within a hunting environment. A plurality of supports is coupled to the tube and is configured for supporting the tube in an upright position relative to a ground surface. A compartment is coupled to the tube and is configured for removably storing a remote camera. An extractor is slidably positionable within the compartment and includes a plate being slidably positioned within the compartment. The plate is abuttable to the bottom wall and a top of the plate is abuttable to a bottom of the remote camera, wherein the extractor removes the remote camera from the compartment as the extractor slides upwardly in the compartment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
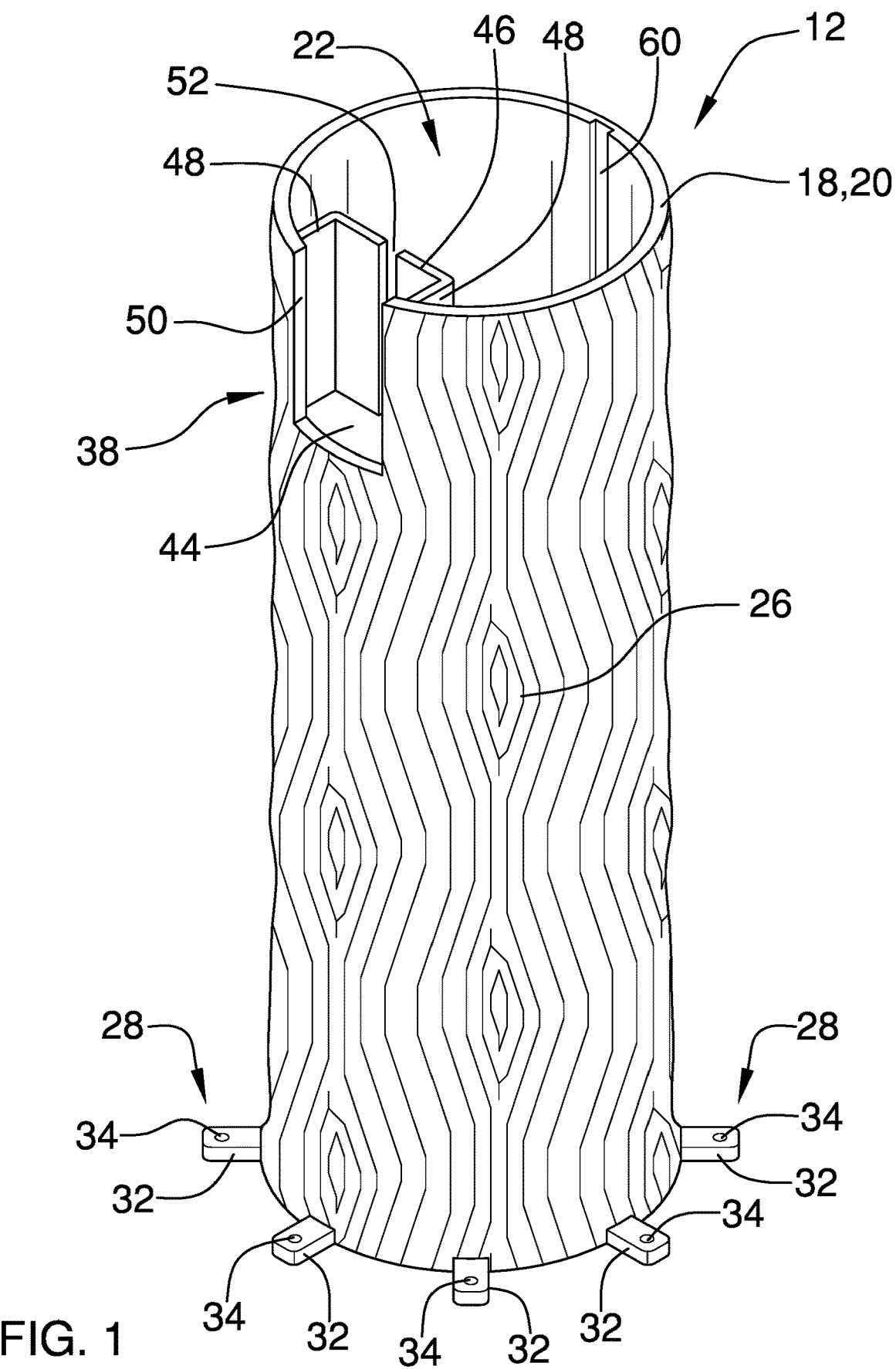
FIG. 1 is a front isometric view of a camera concealing hunting stand assembly according to an embodiment of the disclosure.
Figure 2:
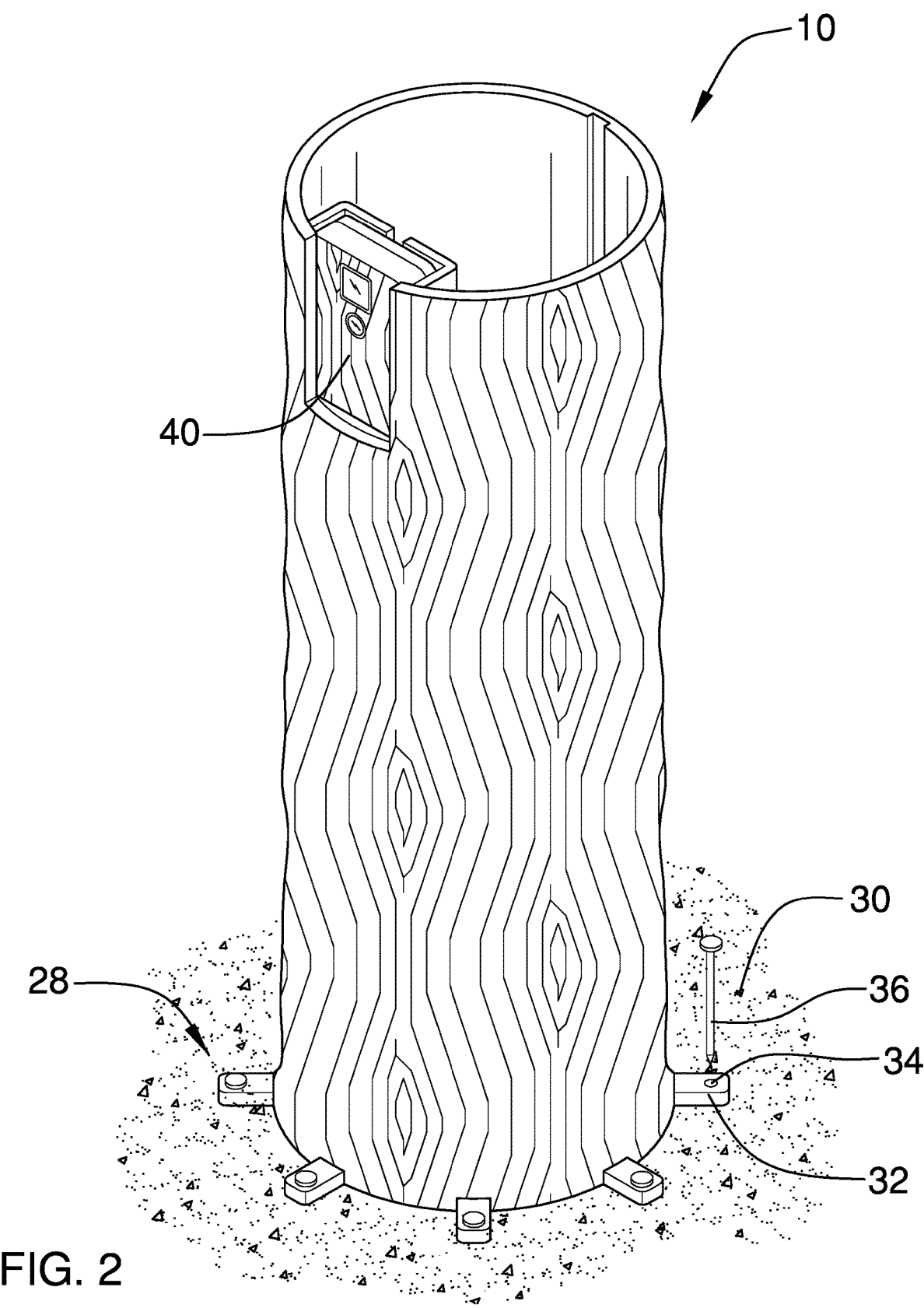
FIG. 2 is an in-use view of an embodiment of the disclosure.
Figure 3:
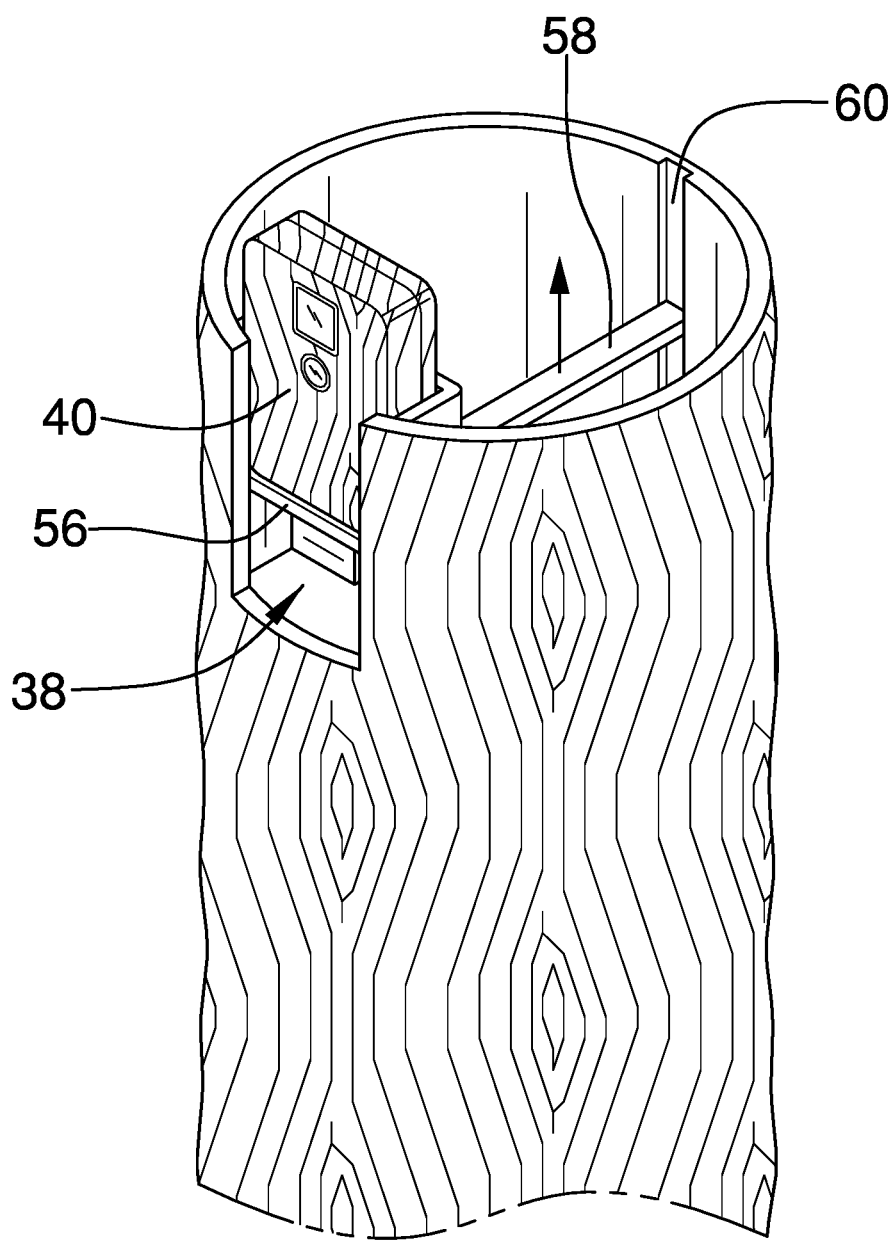
FIG. 3 is a detail isometric view of an embodiment of the disclosure.
Figure 4:
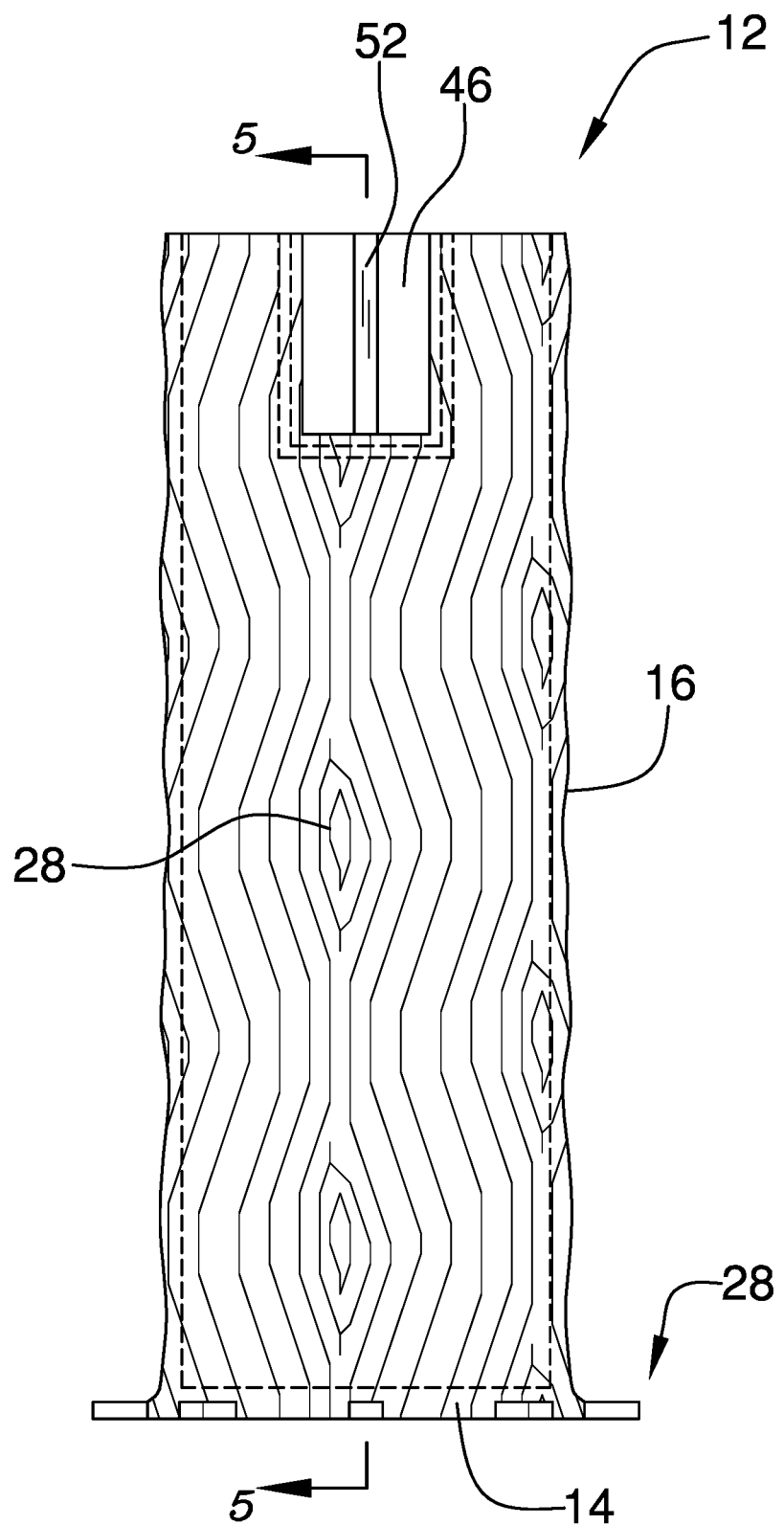
FIG. 4 is a front view of an embodiment of the disclosure.
Figure 5:
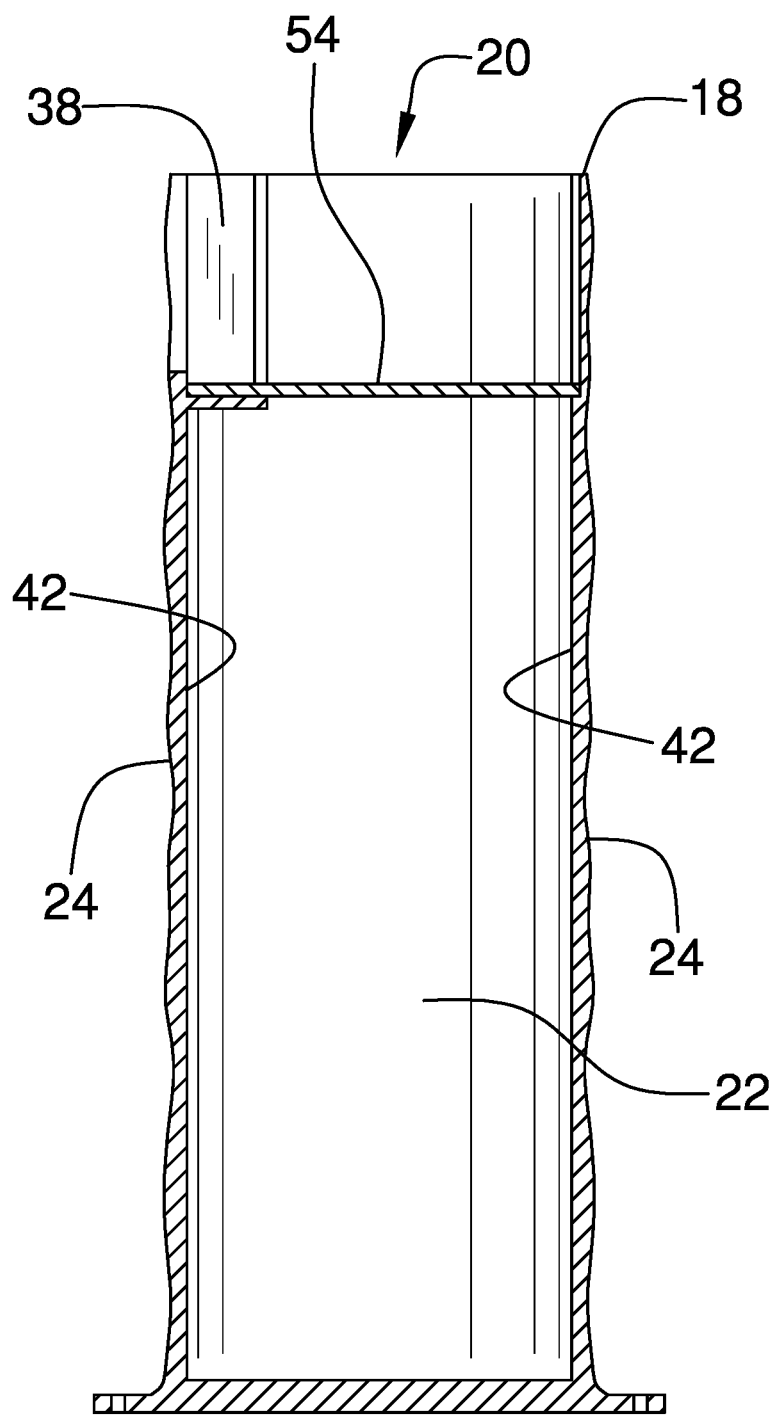
FIG. 5 is a cross-sectional view of an embodiment of the disclosure taken along Line 5-5 of FIG. 4.
Figure 6:
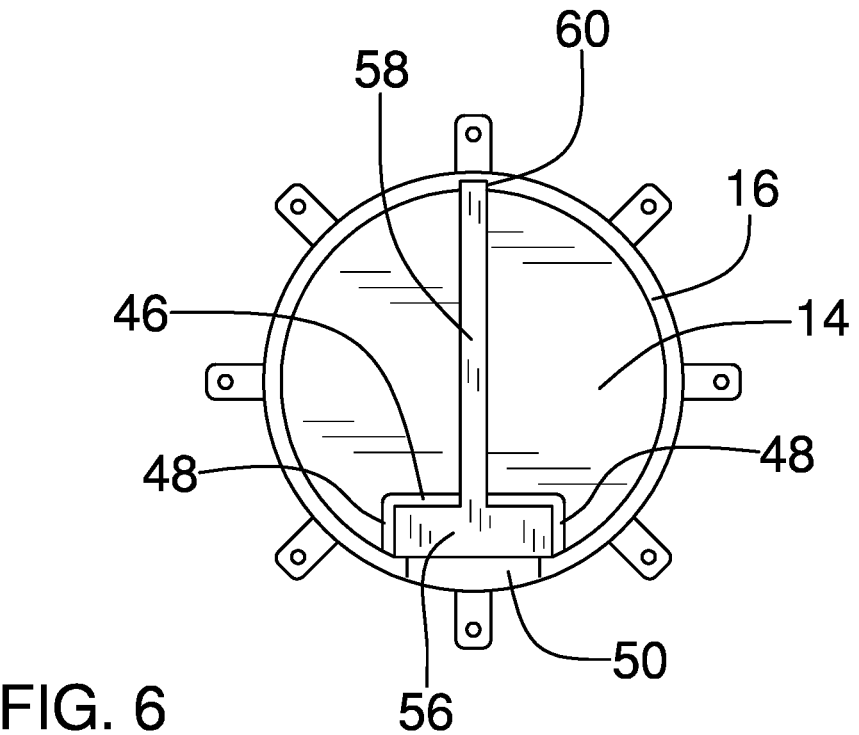
FIG. 6 is a top view of an embodiment of the disclosure.
Figure 7:
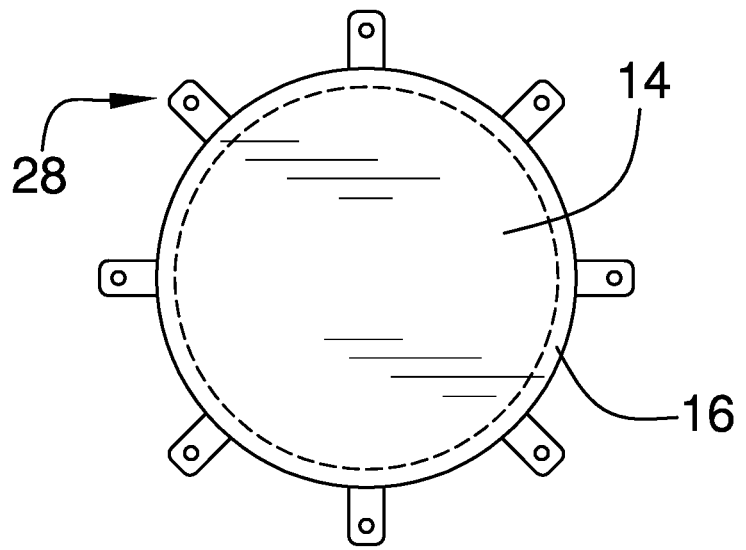
FIG. 7 is a bottom view of an embodiment of the disclosure.

With reference now to the drawings, and in particular to FIGS. 1 through 7 thereof, a new camera housing embodying the principles and concepts of an embodiment of the disclosure and generally designated by the reference numeral 10 will be described.

As best illustrated in FIGS. 1 through 7, the camera concealing hunting stand assembly 10 generally comprises a tube 12 including a base wall 14 and perimeter wall 16 being coupled to and extending upwardly from the base wall 14. A top edge 18 of the perimeter wall 16 defines an opening 20 into an interior space 22 of the tube 12. An exterior surface 24 of the tube 12 has camouflage indicia 26 configured for camouflaging the tube 12 within a hunting environment such as within a forest, a swamp, a prairie, or any conventional hunting environment to prevent attracting attention of hunting game such as deer, pheasants, or any conventional hunting game.

A plurality of supports 28 is coupled to the tube 12 and is configured for supporting the tube 12 in an upright position relative to a ground surface 30. The supports 28 are typically positioned proximate to the base wall 14 and each support 28 of the plurality of supports 28 normally comprises a foot 32 being coupled to the exterior surface 24 and extending outwardly therefrom. An aperture 34 is positioned on a top surface of each foot 32 and extends therethrough. The aperture 34 is configured for receiving a stake 36 or another anchoring device to facilitate securing each support to the ground surface 30.

A compartment 38 is coupled to the tube 12. The compartment 38 is configured for removably storing a remote camera 40 such as a trail camera. The compartment 38 is mounted on an interior surface 42 of the tube 12 and is positioned adjacent to the opening 20 of the interior space 22. The compartment 38 includes a bottom wall 44, a back wall 46, and a pair of side walls 48. The back wall 46 is positioned perpendicular relative to the bottom wall 44 and the pair of side walls 48 is positioned parallel relative to the back 46 and bottom 44 walls. A front of the compartment 38 has a cutout 50 positioned on the perimeter wall 16 and extends through the perimeter wall 16. The back wall 46 may have an elongated slot 52 positioned thereon and extending through the back wall 46.

An extractor 54 is slidably positionable within the compartment 38. The extractor 54 includes a plate 56 being slidably positioned within the compartment 38 and is abuttable to the bottom wall 44. A top of the plate 56 is abuttable to a bottom of the remote camera 40, wherein the extractor 54 removes the remote camera 40 from the compartment 38 as the extractor 54 slides upwardly in the compartment 38. The plate 56 has an arm 58 coupled to the plate 56 and extends through the elongated slot 52, wherein the arm 58 is slidably positionable within the elongated slot 52. The tube 12 has a channel 60 positioned opposite to the elongated slot 52 and the channel 60 receives an end of the arm 58. A bottom end of the channel 60 is equally spaced from the top edge 18 of the tube 12 as the bottom wall 44 of the compartment 38 wherein the arm 58 is positioned perpendicular extending through the tube 12. The back wall 46 of the compartment 38 is spaced from the channel 60 to allow a hand to reach in and grasp the arm 58 to facilitate lifting the extractor 54.

In use, the extractor 54 is positioned within the compartment 38 and the remote camera 40 is positioned within the compartment 38 thereafter. The camouflage indicia 26 on the exterior surface 24 of tube 12 conceals the remote camera 40 within the hunting environment. The arm 58 of the extractor 54 may be grabbed to facilitated sliding the extractor 54 out of the compartment 38, wherein the extractor 54 slides out the remote camera 40 positioned upon the plate 56 of the extractor 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A camera concealing stand assembly comprising:
   a tube including a base wall and perimeter wall being coupled to and extending upwardly from said base wall, a top edge of said perimeter wall defining an opening into an interior space of said tube, an exterior surface of said tube having camouflage indicia configured for camouflaging said tube within a hunting environment;
   a plurality of supports being coupled to said tube and being configured for supporting said tube in an upright position relative to a ground surface;
   a compartment being coupled to said tube, said compartment being configured for removably storing a remote camera;
   an extractor being slidably positionable within said compartment, said extractor including a plate being slidably positioned within said compartment, said plate being abuttable to a bottom wall of said compartment, a top of said plate being abuttable to a bottom of the remote camera, wherein said extractor removes the remote camera from said compartment as the extractor slides upwardly in said compartment.

2. The camera concealing stand assembly of claim 1, wherein said supports are positioned proximate to said base wall.

3. The camera concealing stand assembly of claim 2, wherein each support of said plurality of supports comprise a foot being coupled to said exterior surface and extending outwardly therefrom, an aperture being positioned on a top surface of each foot and extending therethrough, said aperture being receivable of a stake.

4. The camera concealing stand assembly of claim 1, wherein said compartment is mounted on an interior surface of said tube and is positioned adjacent to said opening of said interior space, said compartment including said bottom wall, a back wall, and a pair of side walls, said back wall being positioned perpendicular relative to the bottom wall, said pair of side walls being positioned parallel relative to said back and bottom walls, a front of said compartment having a cutout positioned on said perimeter wall and extending through said perimeter wall.

5. The camera concealing stand assembly of claim 4, wherein said back wall has an elongated slot being positioned thereon and extends through said back wall.

6. The camera concealing stand assembly of claim 5, wherein said plate has an arm being coupled to said plate and extending through said elongated slot, wherein said arm is slidably positionable within said elongated slot, said tube having a channel positioned opposite to said elongated slot, said channel receiving an end of said arm, a bottom end of said channel being equally spaced from said top edge of said tube as said bottom wall of said compartment wherein said arm is positioned perpendicular extending through said tube.

7. The camera concealing stand assembly of claim 6, wherein said back wall of said compartment is spaced from said channel to allow a hand to reach in and grasp said arm to facilitate lifting said extractor.

8. A camera concealing stand assembly comprising:
   a tube including a base wall and perimeter wall being coupled to and extending upwardly from said base wall, a top edge of said perimeter wall defining an opening into an interior space of said tube, an exterior surface of said tube having camouflage indicia configured for camouflaging said tube within a hunting environment;

a plurality of supports being coupled to said tube and being configured for supporting said tube in an upright position relative to a ground surface, said supports being positioned proximate to said base wall, each support of said plurality of supports comprising a foot being coupled to said exterior surface and extending outwardly therefrom, an aperture being positioned on a top surface of each foot and extending therethrough, wherein said aperture being receivable of a stake;

a compartment being coupled to said tube, said compartment being configured for removably storing a remote camera, said compartment being mounted on an interior surface of said tube and being positioned adjacent to said opening of said interior space, said compartment including a bottom wall, a back wall, and a pair of side walls, said back wall being positioned perpendicular relative to the bottom wall, said pair of side walls being positioned parallel relative to said back and bottom walls, a front of said compartment having a cutout positioned on said perimeter wall and extending through said perimeter wall, said back wall having an elongated slot being positioned thereon and extending through said back wall; and an extractor being slidably positionable within said compartment, said extractor including a plate being slidably positioned within said compartment, said plate being abuttable to said bottom wall, a top of said plate being abuttable to a bottom of the remote camera, wherein said extractor removes the remote camera from said compartment as the extractor slides upwardly in said compartment, said plate having an arm being coupled to said plate and extending through said elongated slot, wherein said arm is slidably positionable within said elongated slot, said tube having a channel positioned opposite to said elongated slot, said channel receiving an end of said arm, a bottom end of said channel being equally spaced from said top edge of said tube as said bottom wall of said compartment wherein said arm is positioned perpendicular extending through said tube, said back wall of said compartment being spaced from said channel to allow a hand to reach in and grasp said arm to facilitate lifting said extractor.

\* \* \* \* \*